Feb. 2, 1954  J. T. HAEFNER  2,668,032
FRAME MOUNTING AND ADJUSTING APPARATUS
Filed Nov. 28, 1950  2 Sheets-Sheet 1
FIG. 1
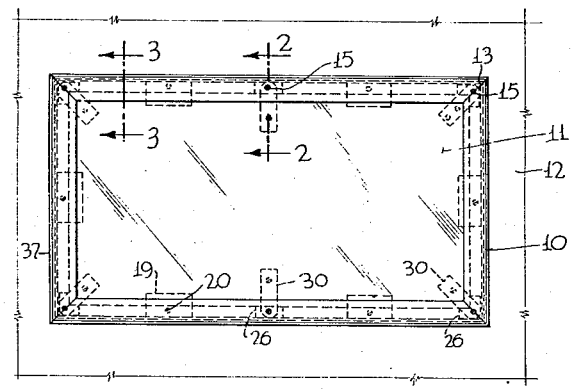
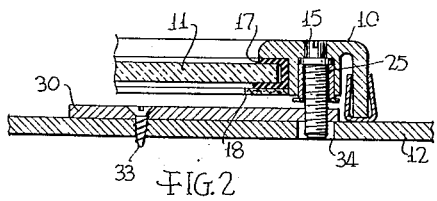
FIG. 2
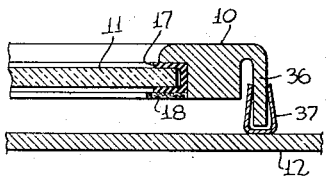
FIG. 3
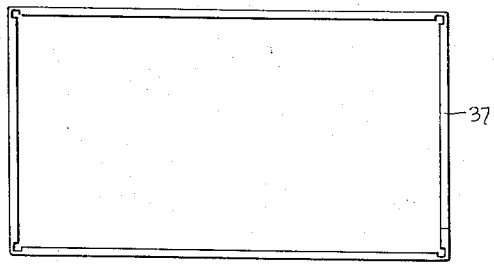
FIG. 4
INVENTOR.
Joseph T. Haefner.
BY
*Maurice A. Creme*
ATTORNEY Feb. 2, 1954 J. T. HAEFNER 2,668,032
FRAME MOUNTING AND ADJUSTING APPARATUS
Filed Nov. 28, 1950 2 Sheets-Sheet 2
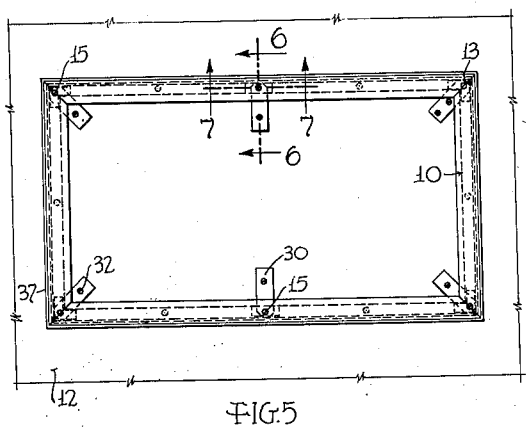
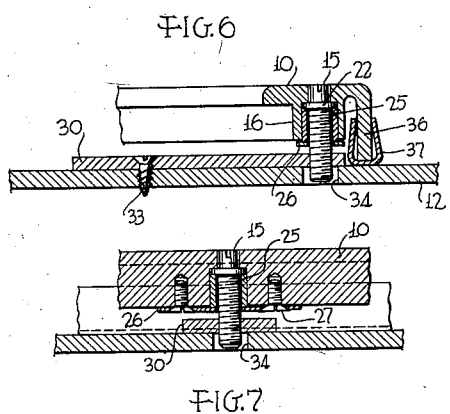
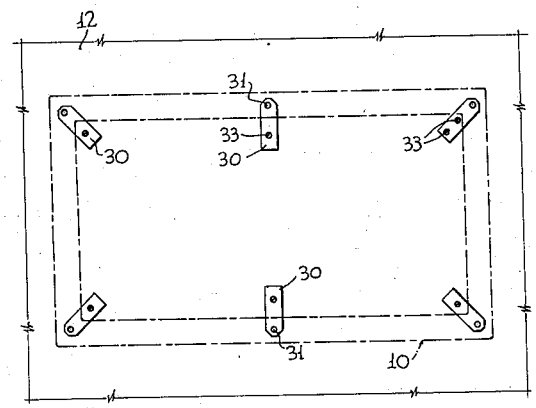
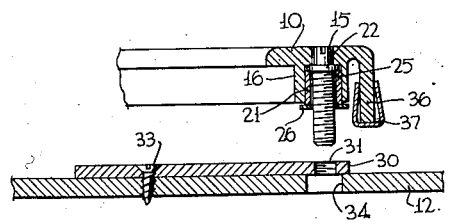
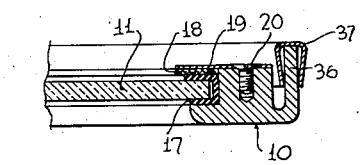
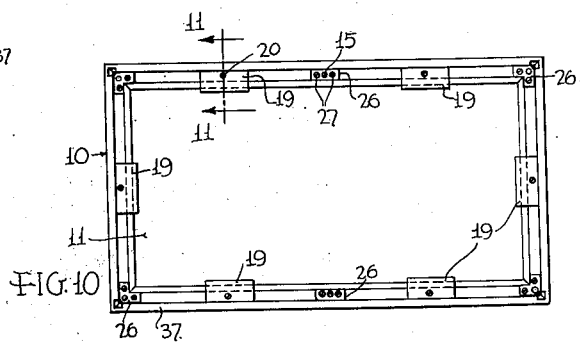
INVENTOR.
Joseph T. Haefner
BY
Maurice A. Crews
ATTORNEY

Patented Feb. 2, 1954

2,668,032

UNITED STATES PATENT OFFICE 2,668,032

FRAME MOUNTING AND ADJUSTING APPARATUS

Joseph T. Haefner, Philadelphia, Pa., assignor to The Budd Company, Philadelphia, Pa., a corporation of Pennsylvania Application November 28, 1950, Serial No. 197,893

3 Claims. (Cl. 248—28)

This invention relates to frame mounting and adjusting apparatus for securing a frame to a wall, and has for an object the provision of improvements in this art.

One of the particular objects of the invention is to provide a frame, as for a mirror, which can be very quickly mounted on a wall.

Another object is to provide a frame which can be quickly adjusted in position on an irregular surfaced wall.

Another object is to provide a frame which can be easily mounted without injury to the object, such as a mirror, which it carries.

Another object is to provide a frame having the advantages desired with a simple, sturdy, and relatively inexpensive construction.

The above and other objects and advantages of the invention will be apparent from the following description of an illustrative embodiment, reference being made to the accompanying drawings, wherein:

Fig. 1 is a front elevation of a mirror frame mounted on a wall in accordance with the present invention;

Fig. 2 is a section taken on the line 2—2 of Fig. 1;

Fig. 3 is a section taken on the line 3—3 of Fig. 1;

Fig. 4 is a face elevation of a finish strip separated from the frame;

Fig. 5 is a view like Fig. 1 but with the mirror removed;

Fig. 6 is a section taken on the line 6—6 of Fig. 5;

Fig. 7 is a section taken on the line 7—7 of Fig. 5;

Fig. 8 is an elevation of the anchor or mounting plates secured to the wall, the position which the frame occupied and which it will again finally occupy being shown in broken lines;

Fig. 9 is a section similar to Fig. 6 showing the frame being removed after the anchor plates have been secured to the wall;

Fig. 10 is a rear view of the frame with the mirror secured therein ready for final mounting on the wall; and Fig. 11 is a section taken on the line 11—11 of Fig. 10.

As shown in the drawings of the preferred embodiment, a frame 10 carries a mirror 11 which is mounted on a wall 12. The wall may be of heavy sheet metal, as is common on rail cars, where the invention has been extensively used. The wall is usually irregular whereas the mirror is a plane and must be mounted in a plane condition to avoid breakage. Heretofore it has been the practice to shim up at each screw location and this procedure is so tedious that the mounting of a mirror has required many hours of work. By the use of the present frame and mounting means the mounting time has been cut down greatly, and, moreover, the mounting means is suitable for any wall location whatever instead of having to be made specially for each location.

The frame may be made of metal and conveniently by arc welding at the corners along miter lines 13 and then grinding to a smooth finish. If desired, the entire outer surface may be finally coated to give a uniform appearance. The frame is adjustably secured to the wall at a plurality of spaced points by screws 15, the heads of which are accessible from the front, as shown in Fig. 1.

The frame on the back and from the interior edge is recessed or rabbeted, as at 16, to receive the mirror 11. Preferably the edges of the mirror are encased in a channel-shaped molding 17 of resilient material, such for example as rubber. This may be backed, if desired, by a strip 18, as of friction tape. The mirror is held in the frame by retaining strips 19 held by screws 20. The strips 19 may be continuous or may be made as a plurality of separate tabs, as shown.

The securing means herein provided make the assembly and removal of the mirror very easy and quick. It will be assumed, for reasons which will be clear after the present mounting means are described, that the mirror is not installed in the frame until the anchorage means have been installed in the manner characteristic of the present invention. In storage and as received for mounting on the wall the frames are free of obstruction in the enclosed area.

The frames have holes 21 to receive the screws 15 and the holes are each counterbored from the rear to receive an annular flange 22 which is provided on the screw. The screw 15 is inserted from the rear and the head, which is cylindrical, fits in the small cylindrical part of the hole.

Means are provided for retaining the screw 15 in the frame for rotation but holding it fixed against axial movement relative to the frame. The means illustrated comprises a sleeve or bushing 25 which surrounds the screw within the enlarged counterbored portion of the hole. The bushing is retained, as by a plate 26 and screws 27. The bushing is slightly longer than the length of the counterbore below the screw flange and the plate 26 is resilient so that the flange is resiliently pressed against the shoulder of the hole. As a result, the screw requires some force for turning and will not vibrate out of a set position.

Anchor means are provided for the screws. As shown, an anchor or mounting plate 30 is provided with a tapped hole 31 for the protruding end of the screw 15. The plate 30 is also provided with a hole 32 to take a screw 33 which secures the plate to the wall. For a sheet metal wall it is preferable to use hardened self-tapping sheet metal screws. The screw 33, of course, turns freely in the hole 32.

As the frames are received for mounting on the wall they are free of mirrors or other obstruction in the enclosed field area and the anchor plates 30 are exposed within the frame. They are pulled up tight against the back of the frame by the screws 15 and are oriented about the screws 15 to occupy fairly closely the equi-angular position relative to the frame, as shown. If the frame is large there may be securement at one or more places along the sides, if desired, and here the intermediate anchor plates 30 are positioned approximately normal to the side of the frame.

The empty frame with the parts thus arranged is brought into proper position on the wall and holes are made in the wall by a suitable tool at the center of each hole 32 in the anchor plates. The anchor plates are then secured to the wall by the screws 33. The adjustment screws 15 are then turned out and the frame removed from the wall, the anchor plates 30 being left on the wall. If necessary, oversized holes 34 are made in the wall to freely receive the ends of the screws 15 which protrude through the tapped holes 31 in the anchor plate.

When it is desired to finally mount the frame with the mirror in position on the wall, say after all other construction work has been completed so the danger of breakage is largely past, the mirror is mounted in the frame by the molding 17, strips 19 and screws 20. The frame with the mirror is then brought into place on the wall and the screws 15 turned into the tapped holes 31 of the anchor plates 30. If the plates have in the meantime been moved out of position it is only necessary to turn them about the screws 33 to bring the holes 31 into proper position. By proper adjustment of the screws 15 the frame is quickly brought into adjusted position on the wall, no matter how irregular the surface.

If the wall surface happens to be plane the rear edge of the frame will fit it closely without leaving any noticeable space or gap anywhere, but if the wall surface is irregular, as it will be in most cases, there will be unsightly gaps in places. The present invention, in conjunction with the frame adjusting means, takes care of this situation by providing an adjustable bridging strip around the frame on the rear. In the form illustrated, the frame is made with a peripheral rearwardly projecting flange 36 and upon this flange there is saddled a U-shaped finish strip 37 which is closed up at the open end sufficiently to bind tightly on the flange.

The U-shaped strip 37 is placed upon the flange before the frame is brought into position for final installation. After the frame has been installed and adjusted, the finish strip is driven back against the wall all around the frame. The finish strip may be made as a single piece, cut out at the corners from the inside and bent to fit the frame. The ends are abutted on a side, preferably near the bottom, where the joint will not be especially noticeable.

It will thus be seen that the invention provides a frame and associated mounting means therefor which enable the frame to be quickly, accurately and firmly mounted on a wall and the space between the frame and wall quickly, fully and effectively closed around the periphery by a closing strip. The frame may be as readily removed. It is adapted without substitution or change of parts for mounting in different wall locations. Moreover, the parts are all simple and relatively inexpensive.

While one embodiment of the invention has been described for purposes of illustration, it is to be understood that there may be various embodiments within the general scope of the invention.

What is claimed is:

1. A frame and mounting means therefor adapted to attach the frame to an irregular wall, comprising in combination with a frame, a plurality of spaced screws disposed in holes in the frame, the screws having their head ends accessible from the front of the frame, the holes in the frame being counterbored from the rear of the frame, an annular flange on each screw within the counterbore, a member within the counterbore encircling each screw and pressing the screw flange against the end of the counterbore, means secured to the rear of the frame pressing said encircling member against the screw flange to retain the screw within the hole and hold it against endwise movement relative thereto but to permit frictional turning movement of the screw, a strap tapped for the screw and adapted to be drawn up tightly against the back of the frame by the screw, the strap extending inwardly of the frame and having a hole to receive a screw or the like to secure the strap to a wall, turning movement of the flanged screws causing adjusting movement of the frame relative to the wall.

2. A frame and mounting means therefor adapted to attach the frame to an irregular wall, comprising in combination with the frame, a plurality of spaced screws rotatably retained in said frame against endwise movement relative thereto, said screws extending therethrough from front to back and having heads accessible from the front of the frame, an anchor plate for each screw adapted to be secured to the wall and having a tapped hole to receive the screw, the frame having a rearwardly extending marginal flange at the outer periphery, and a U-shaped trim piece frictionally embracing said flange for movement from and toward the wall after the frame has been secured in adjusted position by said screws for filling the space between frame and wall.

3. A frame and mounting means therefor adapted to attach the frame to an irregular wall, comprising in combination with the frame, a plurality of mounting and retaining elements, each constructed and arranged to move a part of the frame from and toward the wall, for adjustably mounting the frame at a plurality of spaced points to the wall, and telescopic space filling means frictionally adjustably mounted on the periphery of the frame and accessible from outside the frame for adjustment after the frame has been secured in final position for filling the space between frame and wall after the frame is mounted and adjusted on the wall.

JOSEPH T. HAEFNER.

References Cited in the file of this patent

UNITED STATES PATENTS

| Number | Name | Date |
|---|---|---|
| 1,465,549 | Gilchrist | Aug. 21, 1923 |
| 2,016,604 | Karnell | Oct. 8, 1935 |
| 2,338,559 | Winkelmeyer | Jan. 4, 1944 |

FOREIGN PATENTS

| Number | Country | Date |
|---|---|---|
| 455,765 | Germany | Feb. 27, 1928 |